(12) United States Patent
Krause

(10) Patent No.: US 10,031,863 B2
(45) Date of Patent: Jul. 24, 2018

(54) ACCESS CONTROLLED MEMORY REGION

(71) Applicant: HEWLETT PACKARD ENTERPRISE DEVELOPMENT LP, Houston, TX (US)

(72) Inventor: Michael R. Krause, Boulder Creek, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/109,334

(22) PCT Filed: Jan. 30, 2014

(86) PCT No.: PCT/US2014/013734
§ 371 (c)(1),
(2) Date: Jun. 30, 2016

(87) PCT Pub. No.: WO2015/116077
PCT Pub. Date: Aug. 6, 2015

(65) Prior Publication Data
US 2016/0342534 A1    Nov. 24, 2016

(51) Int. Cl.
*G06F 17/00* (2006.01)
*G06F 12/08* (2016.01)
*G06F 12/0808* (2016.01)
*G06F 12/0815* (2016.01)
*G06F 12/14* (2006.01)
(Continued)

(52) U.S. Cl.
CPC .......... *G06F 12/1458* (2013.01); *G06F 3/065* (2013.01); *G06F 3/0622* (2013.01); *G06F 3/0673* (2013.01); *H04L 69/22* (2013.01); *G06F 2212/1052* (2013.01)

(58) Field of Classification Search
CPC ............ G06F 11/2025; G06F 11/2028; G06F 11/2038; G06F 11/2066
USPC .......................................................... 711/163
See application file for complete search history.

(56) References Cited

U.S. PATENT DOCUMENTS 5,613,088 A  *  3/1997  Achiwa ............... G06F 11/1076
                                                        360/53
6,256,713 B1 *  7/2001  Audityan ................ G06F 13/18
                                                        711/141
(Continued)

FOREIGN PATENT DOCUMENTS

WO    WO2013/012444     *  1/2013  ............. G06F 12/14
WO    WO-2013012444        1/2013

OTHER PUBLICATIONS

Bost, E. et al.; "Hardware Support for Robust Partitioning in Freescale QorIQ Multicore SoCs (P4080 and derivatives)"; May 2013; 35 pages.
(Continued)

*Primary Examiner* — Tuan Thai
*Assistant Examiner* — Mohamed Gebril
(74) *Attorney, Agent, or Firm* — Trop, Pruner & Hu PC.

(57) ABSTRACT

A first component associated with an access controlled memory region receives a transaction request including a protocol header from a second component. The first component sends, to the second component, a negative acknowledgment in response to determining that the second component is not authorized to access the access controlled memory region, based on information in the protocol header.

12 Claims, 10 Drawing Sheets

(51) Int. Cl.
*H04L 29/06* (2006.01)
*G06F 3/06* (2006.01)

(56) References Cited

U.S. PATENT DOCUMENTS

| | | | |
|---|---|---|---|
| 6,438,573 B1* | 8/2002 | Nilsen | G06F 8/10 718/100 |
| 6,631,442 B1* | 10/2003 | Blumenau | G06F 3/0607 711/100 |
| 6,782,410 B1* | 8/2004 | Bhagat | G06F 9/5027 709/201 |
| 6,842,377 B2* | 1/2005 | Takano | G11C 7/1021 365/185.21 |
| 7,017,011 B2* | 3/2006 | Lesmanne | G06F 12/082 711/141 |
| 7,113,995 B1 | 9/2006 | Beukema et al. | |
| 7,196,942 B2* | 3/2007 | Khurana | G11C 7/1051 326/38 |
| 7,269,715 B2* | 9/2007 | Le | G06F 9/3802 712/215 |
| 7,299,266 B2 | 11/2007 | Boyd et al. | |
| 7,321,955 B2* | 1/2008 | Ohmura | G06F 12/0804 711/113 |
| 7,512,736 B1* | 3/2009 | Overby | G06F 3/0607 707/999.202 |
| 7,590,760 B1* | 9/2009 | Banks | G06F 11/2028 709/223 |
| 7,590,982 B1* | 9/2009 | Weissman | G06F 9/4812 710/260 |
| 7,609,636 B1 | 10/2009 | Mott | |
| 7,657,760 B2 | 2/2010 | Teramoto et al. | |
| 8,166,244 B2* | 4/2012 | Fruchter | G06F 9/4445 711/103 |
| 8,181,239 B2 | 5/2012 | Pandya | |
| 8,230,193 B2* | 7/2012 | Klemm | G06F 3/0608 711/114 |
| 8,244,969 B2 | 8/2012 | McWilliams et al. | |
| 8,307,093 B2* | 11/2012 | Klemets | H04L 12/2818 370/254 |
| 8,365,201 B2* | 1/2013 | Holan | G06F 11/3051 715/763 |
| 8,566,546 B1* | 10/2013 | Marshak | G06F 3/0604 711/112 |
| 8,990,527 B1* | 3/2015 | Linstead | G06F 3/0617 711/161 |
| 2002/0091841 A1 | 7/2002 | Beukema et al. | |
| 2004/0068621 A1* | 4/2004 | Van Doren | G06F 12/0828 711/144 |
| 2005/0109828 A1* | 5/2005 | Jay | G06F 9/4451 235/375 |
| 2005/0125607 A1* | 6/2005 | Chefalas | G06F 12/0862 711/113 |
| 2006/0026443 A1 | 2/2006 | McMahan et al. | |
| 2007/0008328 A1* | 1/2007 | MacWilliams | G06F 12/0646 345/530 |
| 2007/0140477 A1 | 6/2007 | Wise | |
| 2008/0065815 A1* | 3/2008 | Nasu | G06F 3/061 711/103 |
| 2008/0155246 A1* | 6/2008 | Jennings | G06F 9/4401 713/2 |
| 2009/0094413 A1* | 4/2009 | Lehr | G06F 3/0605 711/112 |
| 2009/0228648 A1* | 9/2009 | Wack | G06F 11/1092 711/114 |
| 2009/0282101 A1* | 11/2009 | Lim | G06F 9/5077 709/203 |
| 2010/0046267 A1* | 2/2010 | Yan | G11C 16/24 365/51 |
| 2010/0050016 A1* | 2/2010 | Franklin | G06F 11/0727 714/6.32 |
| 2010/0083368 A1* | 4/2010 | Kristensen | G06F 21/34 726/18 |
| 2010/0125712 A1* | 5/2010 | Murase | G06F 11/1458 711/162 |
| 2010/0332780 A1* | 12/2010 | Furuya | G06F 3/0689 711/162 |
| 2011/0202735 A1* | 8/2011 | Kono | G06F 11/1451 711/162 |
| 2011/0307745 A1* | 12/2011 | McCune | G06F 17/30221 714/54 |
| 2011/0317589 A1* | 12/2011 | Jolma | H04W 40/248 370/255 |
| 2012/0072908 A1* | 3/2012 | Schroth | G06F 9/5033 718/1 |
| 2012/0198107 A1* | 8/2012 | McKean | G06F 13/18 710/40 |
| 2013/0007373 A1* | 1/2013 | Beckmann | G06F 12/126 711/136 |
| 2013/0067161 A1* | 3/2013 | Chandra | G06F 13/12 711/114 |
| 2013/0080805 A1* | 3/2013 | Vick | G06F 8/4432 713/320 |
| 2013/0111129 A1* | 5/2013 | Maki | G06F 3/0611 711/117 |
| 2013/0152097 A1* | 6/2013 | Boctor | G06F 9/505 718/103 |
| 2013/0326270 A1* | 12/2013 | Chen | G06F 11/2089 714/6.21 |
| 2014/0003114 A1* | 1/2014 | Pellizzer | H01L 27/2481 365/63 |
| 2014/0258670 A1* | 9/2014 | Venkatasubramanian | G06F 12/023 711/171 |

OTHER PUBLICATIONS

International Searching Authority, The International Search Report and the Written Opinion, dated Mar. 6, 2015, 10 Pages.

* cited by examiner

ACCESS CONTROLLED MEMORY REGION

BACKGROUND

Memory can be used in a system for storing data. A system can include multiple requestors that are able to access data in the memory, which can be implemented using one or multiple memory devices.

BRIEF DESCRIPTION OF THE DRAWINGS

Some implementations are described with respect to the following figures.

DETAILED DESCRIPTION

In a system that has multiple components (e.g. processors, input/output devices, applications, threads, or any other entities that are capable of accessing data), access control of data stored in a memory space can be challenging. A memory space can refer to an overall amount of memory that can be implemented in one or multiple components, where the components can include one or multiple memory devices and possibly one or multiple non-memory devices. A non-memory device can refer to any component in which a segment of a memory space can be defined for storing information.

In a system, certain memory regions of a memory space may contain information (e.g. sensitive or confidential data, machine-executable code, and other information) that is to be accessed only by specific authorized components. Access control can be provided to enable access of a given memory region to specified one or multiple components, and to disable access by other component(s).

In accordance with some implementations, an access control mechanism or technique provides access controlled memory regions, where an access controlled memory region is accessible by only authorized one or multiple components. Note that an authorized component can include any entity that is capable of accessing data, including a processor, an input/output device, an application, a thread, and so forth. In the ensuing discussion, an access controlled memory region is referred to as a memory region with access control (MRAC).

Figure 1:
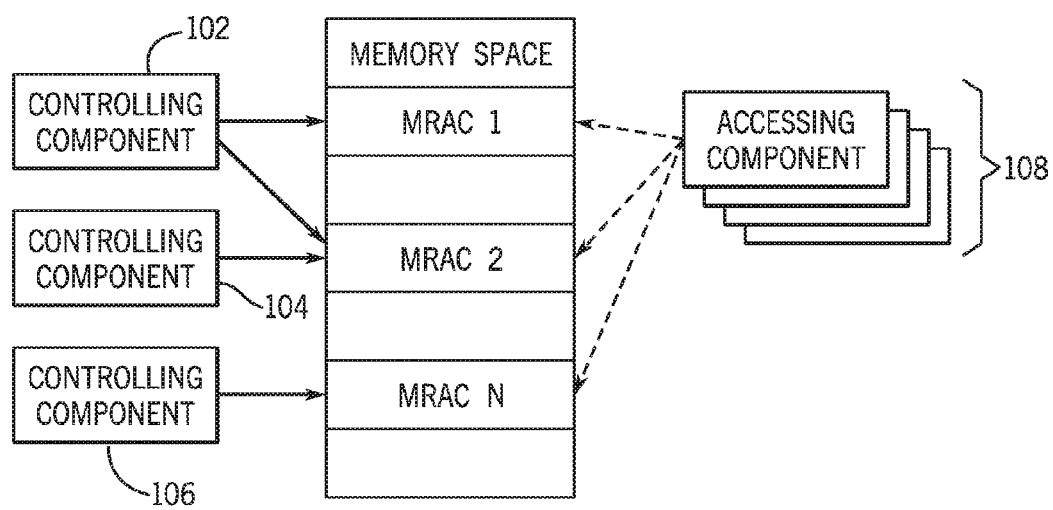
FIG. 1 is a block diagram of an example system including components and access controlled memory regions, in accordance with some implementations.

FIG. 1 illustrates an example arrangement in which a memory space 100 includes multiple MRACs, referred to as MRAC 1, MRAC 2, and MRAC N. In FIG. 1, it is assumed that each MRAC is associated with a respective controlling component 102, 104, or 106. A controlling component is a component that is able to configure and manage a respective MRAC (or multiple MRACs). An MRAC can be separate from or contained within the respective controlling component.

The size of an MRAC can be dynamically provided. Different MRACs can be configured to have different sizes, for example. A maximum MRAC size is implementation-specific, and can be configurable.

Note that each MRAC may be controlled by multiple controlling components. For example, MRAC 2 may be controlled by both controlling components 102 and 104. Also, in the example of FIG. 1, the controlling component 102 is able to manage multiple MRACs (MRAC 1 and MRAC 2).

Although three controlling components are depicted in FIG. 1, it is noted that in alternative implementations, a different number (e.g. less than three or more than three) of controlling components can be included in a system.

A system according to FIG. 1 can also include one or multiple accessing components 108, which can be granted access to one or some combination of MRAC 1, MRAC 2, and MRAC 3. The accesses performed by the access components 108 can include a data read operation, a data write operation, or any other type of operation. To perform access of an MRAC, an accessing component can issue a transaction request. The transaction request can either be issued to a controlling component associated with the accessed MRAC, or alternatively, the transaction request can be issued to access logic provided with the accessed MRAC. A transaction request can specify performance of a transaction with respect to data in a memory region. A transaction can refer to a unit of operation that is performed between end points (e.g. between a requester and a memory or another component).

In accordance with some implementations, access control is based on information in a protocol header of a transaction request. A protocol header of the transaction request contains control information for the transaction. The control information of the protocol header of a transaction request can be included in various protocol fields.

One or some combination of the protocol fields can be used for performing access control with respect to an MRAC. The number of protocol fields used for the access control affects the resolution at which access control is provided. In some implementations, both fine-grained access control and gross-level access control can be provided. In some examples, gross-level access control (e.g. access control of the entire memory space segment available in a given component) can be based on protocol field(s) containing an identifier of a source and/or an identifier of a destination. The identifier in a protocol field in the transaction request can be a switching identifier, which identifies an endpoint (source or destination) of a transaction over a communication fabric. The communication fabric can include one or multiple switches. A switch can refer to a relay engine to relay transactions between interfaces in components. A switching identifier that identifies a source is referred to as a source switching identifier (SSID), while a switching identifier that identifies a destination is referred to as a destination switching identifier (DSID). In other examples, other types of identifiers can be used. Note also that a transaction request can target a component (such as by using an SSID), without targeting a specific memory address.

Fine-grained access control can control access to specific MRACs. To achieve fine-grained access control, one or multiple other protocol fields in the protocol header of a transaction request can be used for determining whether or not the requestor that submitted the transaction request is authorized to access a specific MRAC.

Authorization of a component to access a given MRAC can be statically set, or alternatively, can be dynamically set for a specified time interval, or if one or multiple conditions are met.

Figure 2:
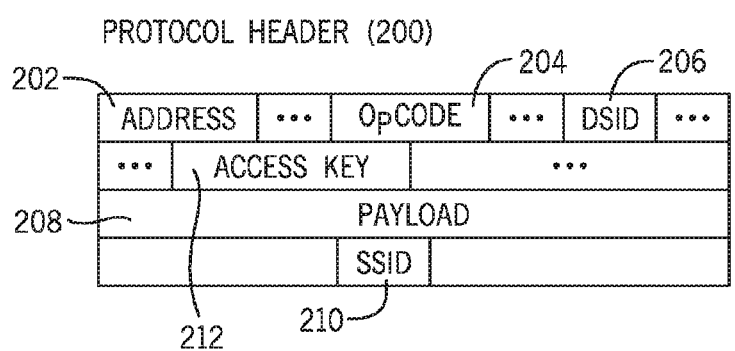
FIG. 2 is a schematic diagram of protocol fields of a transaction, according to some implementations.

FIG. 2 is an example of a protocol header 200 of a transaction request. Various example protocol fields are shown in FIG. 2, with some omitted. Although specific protocol fields are included, it is noted that additional or alternative protocol fields can be included in the protocol header 200 according to other examples.

The protocol fields include an address field 202 that specifies an address associated with a transaction, where the address can identify a location in a memory or other component that contains data for the transaction (the transaction can be a read transaction for reading data, a write transaction for writing data, or another type of transaction). An OpCode field 204 includes one or multiple operation codes, which can be used for specifying a specific operation to be performed for the transaction.

A DSID field 206 identifies a destination of the transaction. A payload field 208 contains a payload (if applicable) for the operation specified by the OpCode field 204. An SSID field 210 includes an SSID to identify the source of the transaction.

In accordance with some implementations, another field in the protocol header 200 is an access key field 212, which can allow for fine-grained access control of specific MRAC(s). An access key can represent a component or a group of components that are authorized to access a given MRAC. One or multiple access keys can be associated with an MRAC, with each access key providing a different level of access. For example, a first access key can be associated with read-write access, while another access key is associated with read-only access, and so forth. Although multiple access keys can be used to provide different levels of access, it is noted that in other implementations, just one access key can be employed for each MRAC. Different MRACs are associated with different access keys.

More generally, an access key is an identifier used to validate access privileges to one or multiple underlying resources, which can include at least one or some combination of the following: a memory region, a component of any type (e.g. processor, memory, switch, field programmable gate array, digital signal processor, graphics processing unit, etc.), a discrete or integrated accelerator, a shared I/O component (e.g. network or storage controller), and so forth.

An access key can be used individually to perform access control of a specific MRAC, or alternatively, an access key can be used in conjunction with at least another protocol field of the protocol header to perform access control.

In some implementations, an access control data structure can be provided to control access of each respective MRAC by accessing components. The access control data structure can be an MRAC table that can contain memory address ranges corresponding to MRACs of a given component. Note that a memory address range, or multiple memory address ranges, can specify memory locations for an MRAC. The MRAC table can associate each access key with one or multiple memory address ranges.

In other examples, the access control data structure can be an access control list, with one access control list provided per MRAC.

Figure 3:
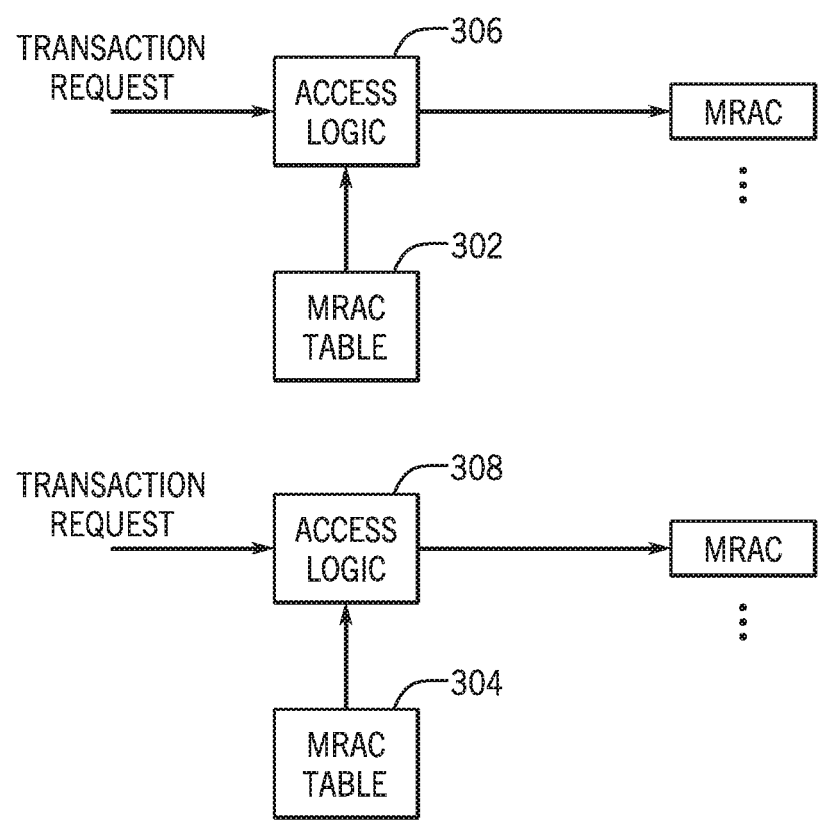
FIG. 3 is a block diagram of an example arrangement including access logic and access controlled memory regions, according to some implementations.

FIG. 3 is a schematic diagram of an arrangement in which an MRAC table (MRAC tables 302 and 304 shown in FIG. 3) can be used. Each MRAC table 302 or 304 is accessible by a respective access logic 306 or 308 to determine whether a transaction request is allowed to access a respective MRAC (or MRACs). In some examples, each access logic 306 or 308 can be part of a controlling component (e.g. 102, 104, or 106 in FIG. 1), or can be separate from the controlling component.

If a given access logic controls access to multiple MRACs, then the corresponding MRAC table can include multiple entries, one for each MRAC. Each entry of the MRAC table can associate an access key with one or multiple memory address ranges that correspond to the respective MRAC.

In operation, in response to a transaction request, an access logic uses the access key (and possibly other protocol header information) to look up the MRAC table for determining whether or not the transaction request is authorized to access a requested MRAC. For example, if the access key in the transaction request matches an access key in the MRAC table, then access of the MRAC is authorized. However, if the access key in the transaction request does not match any access key in the MRAC table, then access of the MRAC is denied.

More generally, the access logic compares protocol header information of a transaction request with protocol header information contained in an access control data structure (e.g. MRAC table, access control list, or other data structure) to determine whether or not the transaction request is authorized to access the respective MRAC.

Key management of access keys (e.g. association of access keys with MRACs) can be performed by entity that is separate from the access logic 306 and 308. For example, key management can be performed by a management application or other management entity. Access keys can be communicated to components using control transactions that are only to be transmitted to trusted components, as determined by the management entity.

Note also that the creation and management of MRACs can be implemented by machine-executable instructions (e.g. software or firmware) in a system. This can allow unintelligent hardware to support MRAC capabilities through simple low-cost comparators invoked as part of the protocol validation process.

Figure 4:
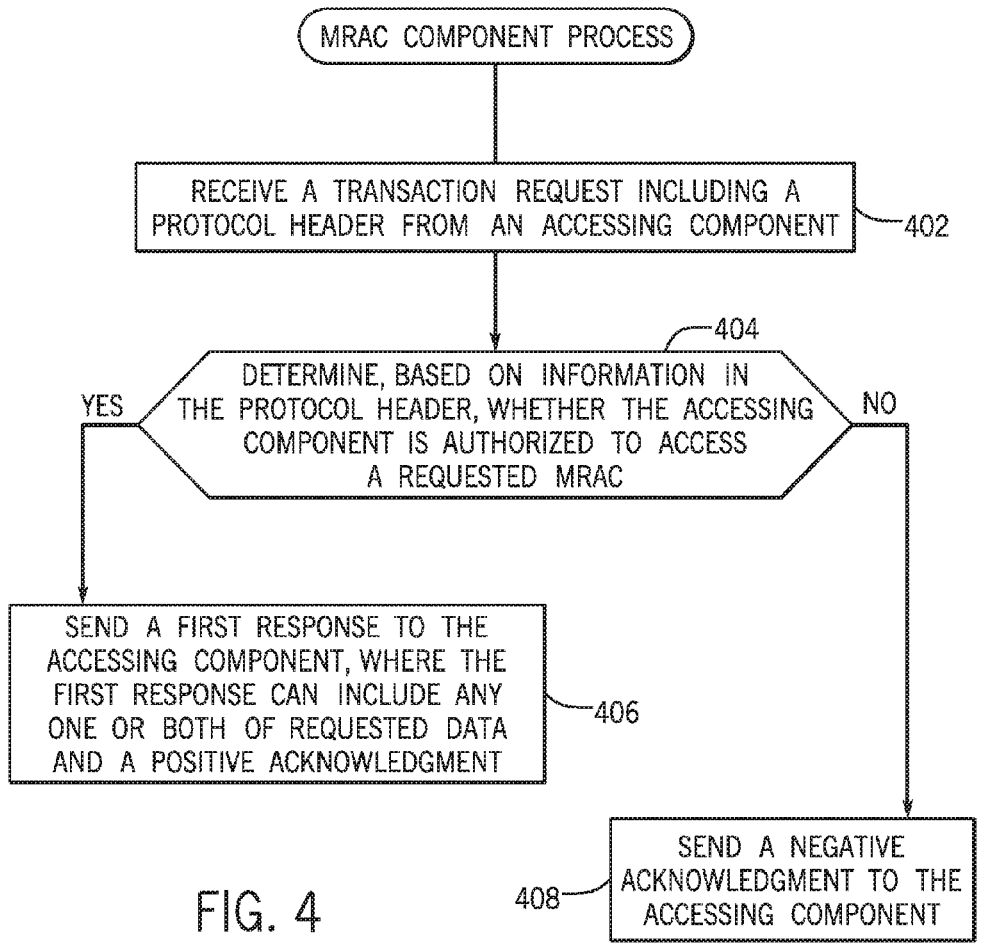
FIG. 4 is a flow diagram of a process according to some implementations.

FIG. 4 is a flow diagram of a process of accessing an MRAC, according to some implementations. An MRAC component (a component that includes one or multiple MRACs) receives (at 402) a transaction request including a protocol header from an accessing component. The MRAC component (which can include the access logic 306 or 308 of FIG. 3, for example), determines (at 404) based on information in the protocol header, whether the accessing component is authorized to access the requested MRAC. The determination (at 404) can employ an MRAC table (e.g. 302 or 304 in FIG. 3), for example.

If the MRAC component determines (at 404) that the access component is authorized to access the requested MRAC, then the MRAC component sends (at 406) a first response to the accessing component, where the first response can include any one or both requested data and a positive acknowledgment indicating successful performance of the requested transaction.

If the MRAC component determines (at 404) that the access component is not authorized to access the requested MRAC, then the MRAC component sends (at 408) a negative acknowledgment to the accessing component.

Figure 5:
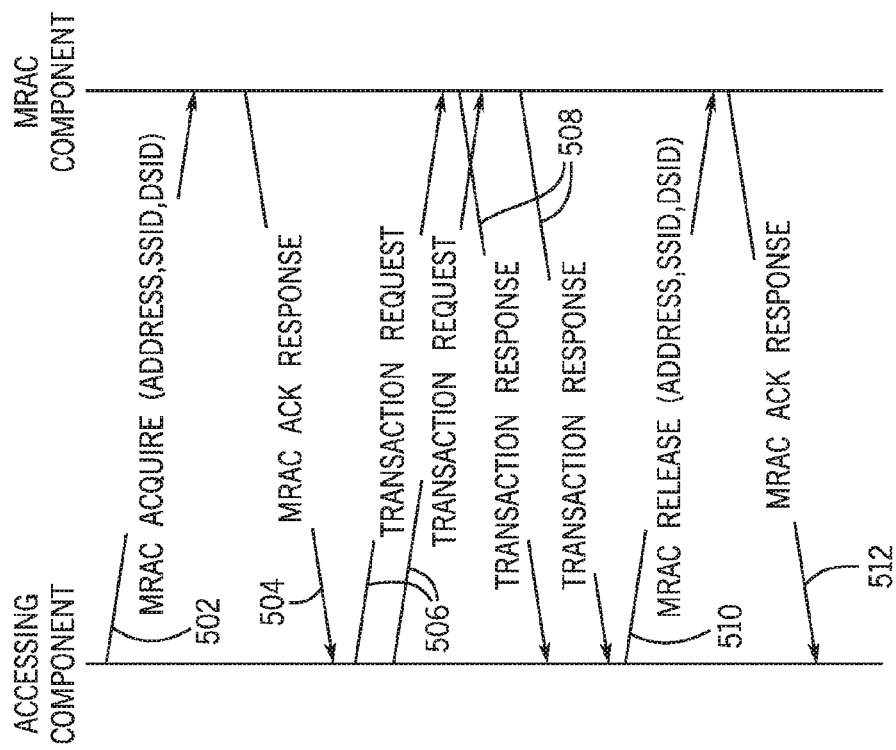
FIGS. 5-8 are message flow diagrams of various message sequences, according to various implementations.

FIG. 5 is a message flow diagram of a message sequence between an accessing component and an MRAC component (which includes an MRAC that is to be accessed by the accessing component). Although specific messages are depicted in FIG. 5, it is noted that in other examples, other types of messages can be employed to allow an accessing component to access the MRAC component.

The accessing component issues, to the MRAC component, an MRAC Acquire request (502), which can contain an address (identifying the memory location being accessed), an SSID (identifying the source of the transaction, which is the accessing component), and a DSID (identifying the destination of the transaction, which is the MRAC component) in the protocol header of the MRAC Acquire request. Note that the MRAC Acquire request is submitted to gain access to the MRAC by the accessing component. If the MRAC is configured, the MRAC component sends an MRAC ACK (acknowledgment) response (504) to the accessing component, where the MRAC ACK Response contains authorization information (e.g. an access key) for use by the accessing component in accessing the MRAC. Once the accessing component obtains the access key for the MRAC, the accessing component becomes an authorized component (authorized to access the MRAC).

Subsequently, the accessing component can submit one or multiple transaction requests (506) to the MRAC component. Each transaction request can include the access key returned by the MRAC component to the accessing component in the MRAC ACK Response. In response to the transaction requests, the MRAC component can send transaction responses (508) back to the accessing component.

Note that a transaction response can include requested data, a positive ACK indicating successful completion of the requested transaction, or a negative ACK (NAK) indicating unsuccessful completion of the requested transaction.

When the accessing component no longer desires access of the MRAC component, the accessing component can send an MRAC Release request (510) to the MRAC component, where the MRAC Release request can include an address, an SSID, and a DSID. In response, the MRAC component sends an MRAC ACK response (512), which indicates release of the MRAC component.

If the MRAC Release request (510) is submitted by the controlling component to the MRAC component, then one of several actions can be performed by the MRAC component. For example, the MRAC component can destroy or otherwise remove the corresponding MRAC. As a further example, an indicator can be set indicating that the MRAC is to be destroyed or otherwise removed. In response to the MRAC Release request, the MRAC component can send an MRAC ACK response (512).

Figure 6:
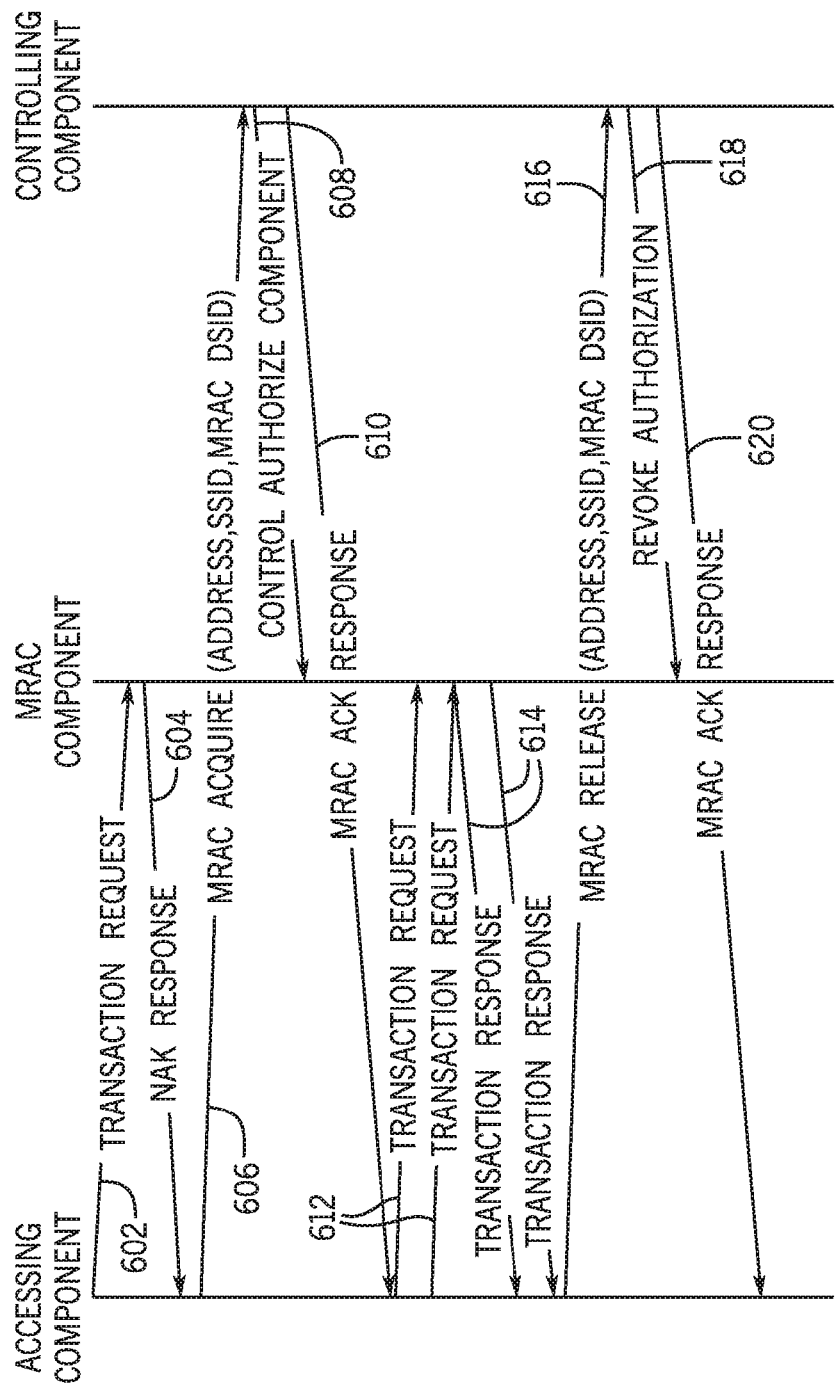

FIG. 6 illustrates an example message flow diagram of a message sequence in a scenario where an accessing component (that is initially unauthorized) attempts access of an MRAC in an MRAC component by issuing a transaction request. The initially unauthorized accessing component sends a transaction request (602) to the MRAC component, which responds with a NAK response (604) that indicates unauthorized access and provides the SID of the controlling component for the target MRAC. Alternatively, the SID may be of an exception handling or management component used to resolve unauthorized access requests. The SID can be configured by a management entity, which can make it simple for the MRAC component to just plug in this value into the NAK response (604).

The accessing component issues an MRAC Acquire request (606) to the controlling component. The accessing component includes the DSID of the MRAC component (indicated as MRAC DSID in FIG. 6). The MRAC Acquire request may include additional qualifiers such as read-write or read-only access, scope of the request, identity of requesting component, and so forth. The MRAC Acquire request may be ultimately processed by a management application operating above the controlling component, in some examples, or the MRAC Acquire request may be processed by the controlling component.

The controlling component authorizes the accessing component either by returning the MRAC access key in an MRAC ACK response (610) or by configuring access in the MRAC component (608) and instructing the accessing component to attempt the transaction request (previously denied) again.

Once authorized, the accessing component can issue transaction requests (containing the respective access key) (612) to the MRAC component, which can respond with respective transaction responses (614).

When the accessing component no longer wishes access of the target MRAC, the accessing component issues an MRAC Release request (616) to the controlling component, which then revokes the accessing component's authorization. The revocation of the authorization can be performed by sending an MRAC ACK response (620) or by revoking the accessing component's authorization at the MRAC component (618).

Note that the controlling component may revoke the accessing component's authorization at any time without informing the accessing component. When this occurs, the accessing component receives a NAK response on the next access attempt. If the controlling component does not want to allow the accessing component to request access, the NAK response can indicate that the MRAC does not exist and there is no controlling component.

Figure 7:
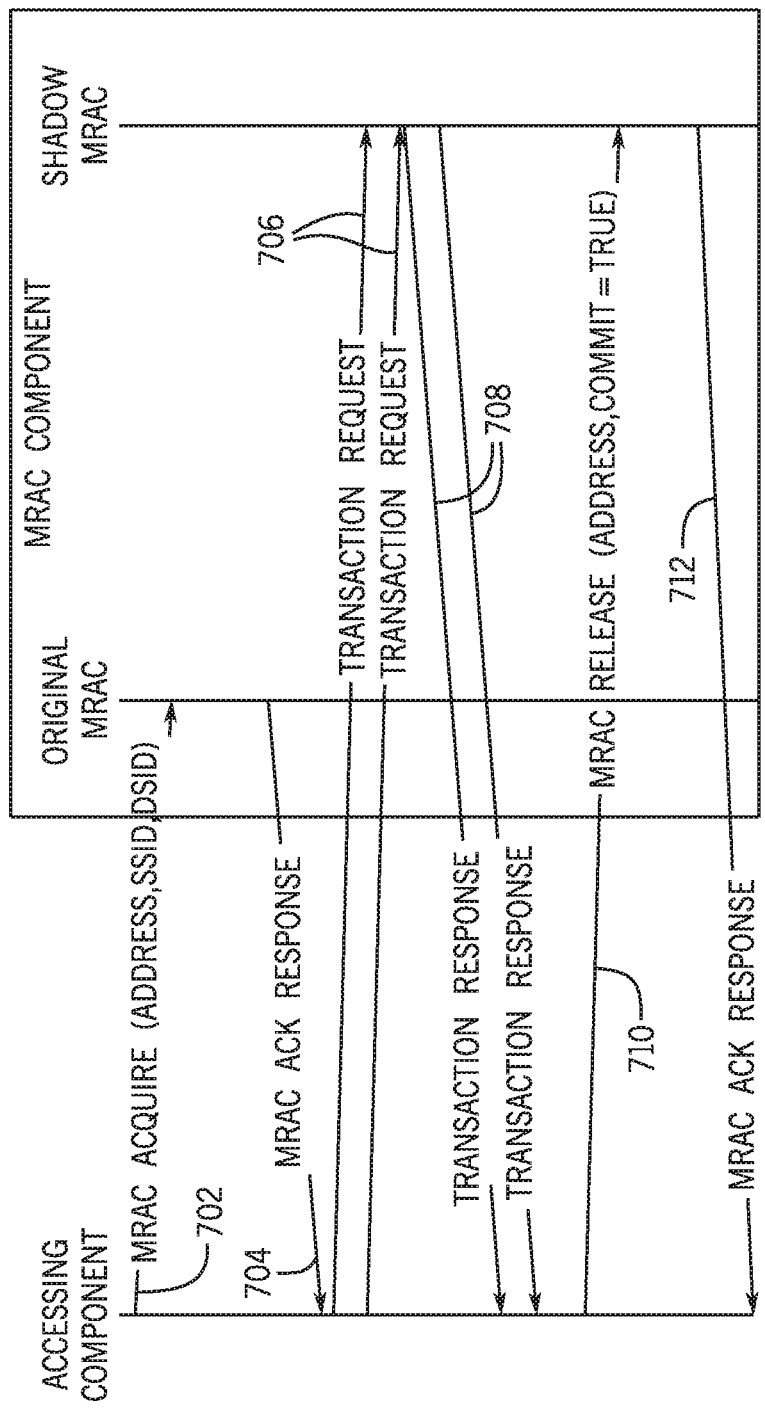

FIG. 7 illustrates an example message flow diagram of a message sequence in which atomic update of a memory region (of arbitrary size) is allowed. Atomic update of a memory region refers to a transaction in which the updates have to all occur to the memory region before any further transaction can be performed on the memory region. This memory region of arbitrary size can be in the form of an MRAC. The memory region has to remain unchanged pending an atomic update of the memory region, with an option to roll back to the original state if the update is cancelled or is otherwise unable to complete.

To accomplish the foregoing, the atomic update process can freeze an MRAC and create a shadow copy of the MRAC in response to a request from an accessing component. For example, as shown in FIG. 7, the accessing component can issue an MRAC Acquire request (702) to the MRAC component, where the request is for an "original" MRAC (the MRAC existing at the time of the MRAC Acquire request). The MRAC Acquire request (702) specifies (such as in an OpCode field) that access of the Original MRAC is part of the atomic update process.

In response, the MRAC component creates a shadow MRAC (which is a copy of the original MRAC), and returns an MRAC ACK response (704) to the accessing component.

While the shadow MRAC is being created, some amount of delay may be experienced for transaction requests from the accessing component. A protocol can be used by the accessing component and MRAC component that allows transaction processing to be temporarily delayed without triggering fatal errors (e.g. the transaction processing can use transparent end-to-end error recovery). To reduce resource usage, the shadow MRAC may contain only those pages that have been modified.

Subsequent transaction requests (706) from the accessing component are processed using the shadow MRAC, with the MRAC component responding with transaction responses (708). The MRAC component can redirect the subsequent transaction requests to the shadow MRAC. Such redirecting can be as simple as updating the MRAC component's internal memory management unit (MMU) to target the shadow MRAC instead of the original MRAC.

The actual process of creating a shadow MRAC is implementation-specific and may be performed entirely by software or in conjunction with hardware.

When the accessing component no longer wishes access of the target MRAC, the accessing component issues an MRAC Release request (710) to the controlling component, with a Commit indicator set to a true value to indicate that the release of the MRAC is to be performed with a commit of the updates made in the MRAC by the accessing component. In response to the MRAC Release request, the MRAC component can commit by either (1) copying the shadow MRAC to the original MRAC (such that the original MRAC contains the updated data); or (2) releasing the original MRAC and using the shadow MRAC as the actual MRAC.

The MRAC component then returns an MRAC ACK response (712) to the accessing component, in response to the MRAC Release request (710).

If the MRAC Release request from the accessing component includes the Commit indicator set to the false value (indicating release without commit), then the MRAC component can discard the shadow MRAC, which effectively restores the MRAC to its original state.

The following describes examples where accessing components that are non-coherent with each other share the same memory region. Without some degree of coordination between the accessing components, updates by a first of the accessing components may lead to inconsistent data being read by a second of the accessing components (e.g. due to the first accessing component failing to flush updated data from cache memory to the shared memory region).

To ensure that accessing components that share a memory region have access to consistent data in the presence of data updates made by the accessing components to the shared memory region, access control may be configured (statically or dynamically) such that one accessing component has read-write access of the shared memory region (a given MRAC), while another accessing component has just read-only access. This ensures only read-write accessing components can update the shared MRAC while constraining read-only access components to non-update transactions. Read-write access versus read-only access can be enforced by using different access keys for the shared MRAC, as described further above.

At a later time, a read-write accessing component can be changed to read-only, while a read-only accessing component can be changed to read-write. The configuration of the read-write access and read-only access can be performed at page-level granularity (where an accessing component can be configured to have read-write access or read-only access of a page or pages of the shared MRAC).

In some examples, multiple MRACs (shared by non-coherent accessing components) can be provided. A first non-coherent accessing component can control a first shared MRAC with read-write access, where the first shared MRAC can be updated with data accessible by another non-coherent accessing component that has read-only access of the first shared MRAC. A second non-coherent accessing component can control a second shared MRAC with read-write access, where the second shared MRAC can be updated with data accessible by another non-coherent accessing component that has read-only access of the second shared MRAC. Using such an approach simplifies communications among the non-coherent accessing components while preserving appropriate isolation.

To ensure that a shared MRAC reflects correct data when accessed by multiple non-coherent accessing components, page-level ownership can be defined within the shared MRAC. Ownership is tracked within each of the non-coherent accessing components. In some implementations, instead of targeting the shared MRAC directly, a first accessing component can target a transaction request for a particular page to the owner (a second accessing component) of the page. The second accessing component can proxy the transaction request and return the respective response to the first accessing component. An owner accessing component (of a particular page that is being accessed) can ensure that a transaction is coherently processed and any response reflects the correct data.

Figure 8:
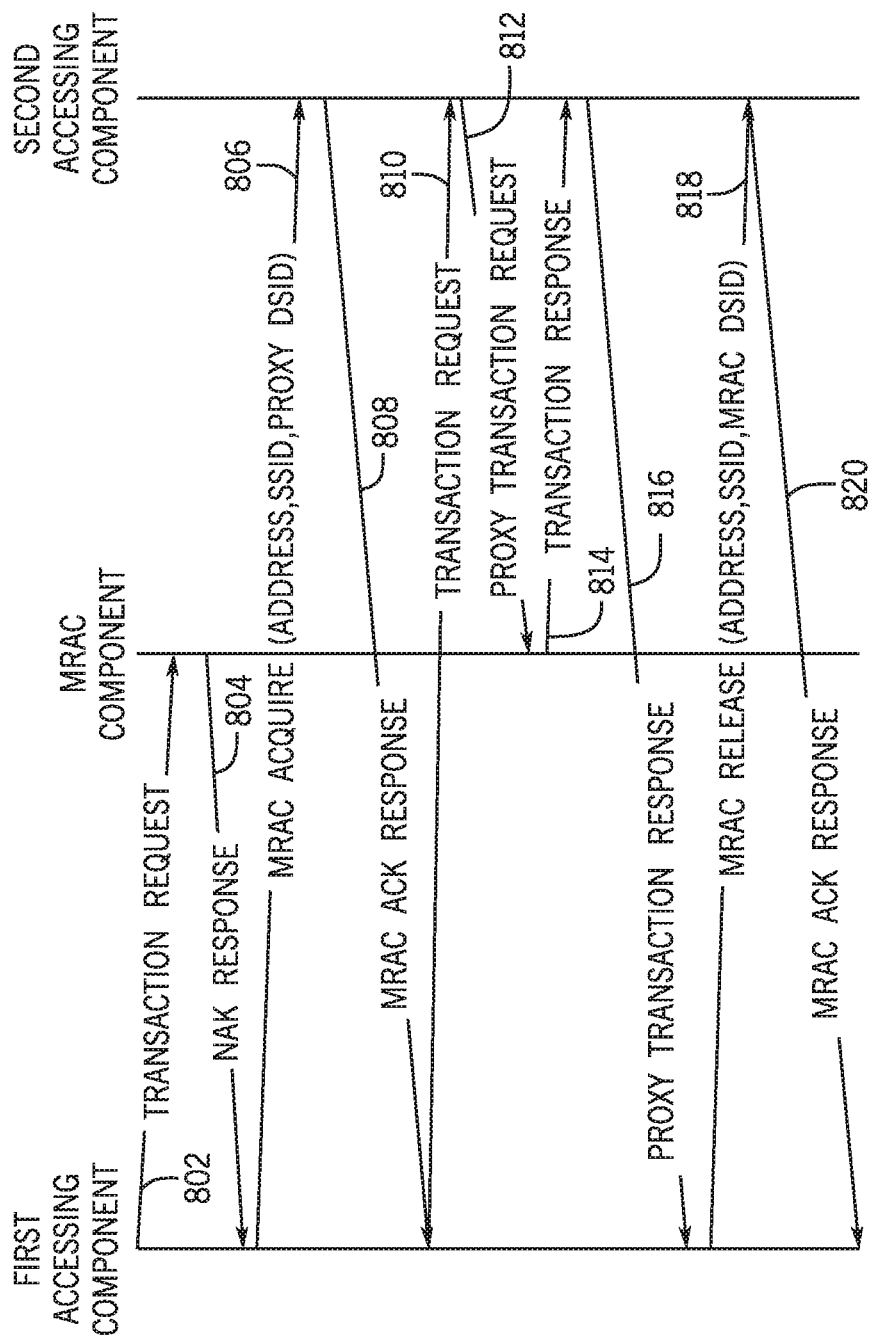

FIG. 8 illustrates an example message flow diagram of a message sequence which involves multiple non-coherent accessing components (including a first accessing component and a second accessing component as depicted in FIG. 8) capable of accessing a shared MRAC. The first accessing component sends a transaction request (802) to the MRAC component. It is assumed that the transaction request (802) targets a memory portion (one or multiple pages of a shared MRAC or an entire shared MRAC) that is owned by the second accessing component. The MRAC component responds with a NAK response (804) that has a reason code indicating why access is denied and who to contact to obtain access. The reason code can indicate that proxy access is to be performed, and can include an SID of the owner (referred to as the "proxy SID") of the targeted memory portion.

Once the proxy SID is known, the first accessing component sends an MRAC Acquire request (806) that contains an address (of the memory location being accessed), an SSID (identifying the first accessing component), and a proxy DSID (identifying the proxy, which in the example of FIG. 8 is the second accessing component). The MRAC Acquire request (806) is received by the second accessing component, which responds with an MRAC ACK response (808) that contains authorization information (e.g. an access key) useable by the first access component to access the targeted memory portion.

Using the foregoing, the MRAC component can assist an accessing component in identifying an owner of a targeted memory portion, without having to involve software in the system. Further, ownership may be migrated by leveraging a NAK response to communicate the new owner.

As further shown in FIG. 8, after receiving the MRAC ACK response (808) from the second accessing component, the first accessing component can send a transaction request (810) to the second accessing component. The second accessing component proxies the transaction request (812) to the MRAC component. The MRAC component responds to the second accessing component with a transaction response (814), which is proxied as a transaction response (816) back to the first accessing component.

In FIG. 8, the second accessing component acts as a proxy and forwards requests to and responses from the MRAC component.

In further examples, to improve performance, the second accessing component may request the MRAC component to return the transaction response (to the transaction request) to the requesting first accessing component without passing through the second accessing component.

When the first accessing component no longer wishes access of the target memory portion, the first accessing component issues an MRAC Release request (818) to the second accessing component. The second accessing component responds with an MRAC ACK response (820) to the first accessing component.

Figure 9:
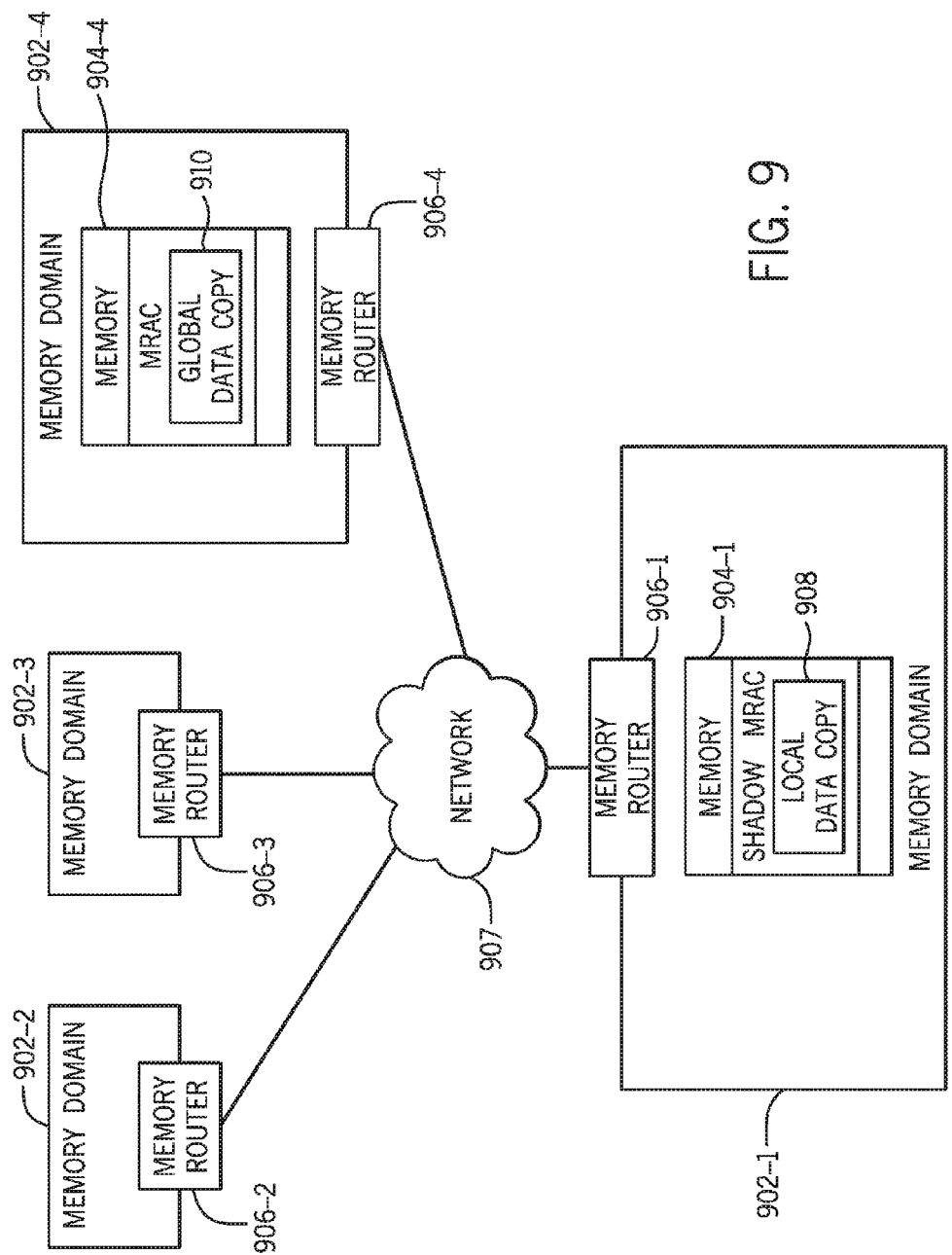
FIG. 9 is a schematic diagram of an example arrangement including multiple memory domains, according to further implementations.

FIG. 9 illustrates an example that includes multiple memory domains 902-1, 902-2, 902-3, and 902-4, where each memory domain includes a respective memory 904-1, 904-2, 904-3, and 904-4. The memory domains 902-1, 902-2, 902-3, and 902-4 can be interconnected by memory routers 906-1, 906-2, 906-3, and 906-4 over a network 907.

A memory router can perform address translation between an address of a local domain view and an address of a global domain view. The memory domain 904-1, for example, has a local domain view of a local data copy 908 stored in the memory 904-1 of the memory domain 904-1.

Another memory domain, e.g. 902-4, can have a global data copy 910. The memory domain 902-4 has a global domain view of the local data copy 908 stored in the memory domain 902-1.

A challenge associated with the arrangement of FIG. 9 is how to prevent the local data copy 908 from becoming stale with respect to the global data copy 910, which can lead to inconsistent data.

To address the foregoing, as shown in FIG. 9, the global data copy 910 can be considered an original MRAC, and the local data copy 908 can be considered a shadow MRAC (this is similar to the solution discussed above in connection with FIG. 7). However, instead of co-locating the original MRAC and shadow MRAC in the same MRAC component, as discussed in connection with FIG. 7, the original MRAC and shadow MRAC of FIG. 9 are stored in separate memory domains (902-4 and 902-1 in the example of FIG. 9).

Once the shadow MRAC is created, subsequent transaction requests of the original MRAC are redirected to the shadow MRAC for servicing. Similarly, when a shadow MRAC is no longer used, the release techniques discussed above in connection with FIG. 7 can be used Once a shadow MRAC is created, any attempt to access the original MRAC is denied. There are two techniques of handling this:
(1) The original MRAC's component acts as a proxy and transparently forwards transaction requests and returns transaction responses in similar fashion as in FIG. 8; or
(2) The original MRAC's component returns a NAK response informing the requestor regarding how to access the shadow MRAC directly.

In some implementations, a combination of both techniques (1) and (2) can be employed, according to the following. If the requestor is local to the original MRAC's component, then a NAK response is returned directing the requestor to a local MMU (of the memory domain 904-1) to which transaction requests are to be directed. The local MMU can act as a proxy in this example.

If the requestor is not local to the original MRAC's component, the requestor's local MMU filters transaction requests and acts as a proxy.

If the requestor is local to the shadow MRAC's component, then the requestor's local MMU filters a transaction request and either returns a NAK response with the shadow MRAC's local component address or the local MMU acts as a proxy for the shadow MRAC.

In some examples, a NAK response may be useful for communicating when an MRAC is no longer accessible due to an internal error that prevents any access. For example, a memory module may suffer a fatal error resulting in 25% of its storage resources failing. Any access to the failed 25% of the memory module can result in a NAK response with a reason code indicating the memory region is not available, while still allowing access to the operational 75% of the memory module. A variety of reason codes can be used to assist in error recovery, diagnostics, and so forth, such as:

Unauthorized access—this can redirect the requestor to the entity that manages exception handling;

Non-accessible memory address—the requestor has incorrect privileges or the requested memory range is no longer accessible;

Non-existent memory address—the requested memory address no longer exists;

Segmentation violation—the memory address and corresponding length exceeds the accessible or authorized memory;

No permission—the requestor currently lacks permission to read or modify the requested memory portion.

Further example applications are discussed below.

Figure 10:
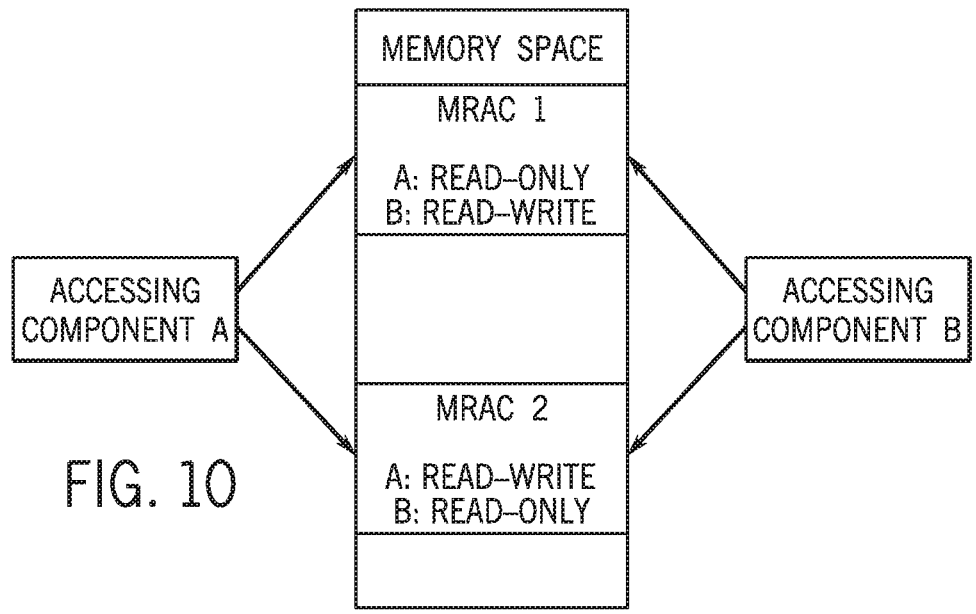
FIG. 10 is a schematic diagram of multiple accessing components that are able to access respective access controlled memory regions, according to further implementations.

A memory may be shared by multiple components. To prevent data leakage as well as to preclude errant updates (updates that may result in inconsistent data), multiple MRACs can be configured with designated permissions, e.g. no access, restricted access such as read-only, or unrestricted access such as read-write. FIG. 10 illustrates two components each with restricted access to one MRAC and unrestricted access to another MRAC. For example, component A has restricted access (read-only access) to MRAC 1, and unrestricted access (read-write access) to MRAC 2. Component B has unrestricted access to MRAC 1, and restricted access to MRAC 2. This configuration allows multiple components to easily share information while preventing errant updates. Further, this single-writer configuration simplifies coherency management between non-coherent components. For example, when component A updates MRAC 2, component A can issue a unicast (or multicast if there are multiple readers) invalidate request to component B, to cause component B to re-read the impacted address range.

Another example application involves the use of a virtual memory fabric. In such examples, access key field (e.g. 202 in FIG. 2) can be treated as a virtual memory fabric identifier (conceptually similar to an 802.1Q virtual local area network (VLAN) identifier).

In such examples, only components sharing a common access key may exchange end-to-end transactions. Each virtual fabric represents a distinct SID space. Switching is performed using a combination of a DSID and an access key of the transaction. Virtual fabrics may share underlying physical resources. For example, an MRAC within a component may be assigned multiple access keys without exposing all memory resources. A shared MRAC may be used as a message-passing medium between two virtual memory fabrics.

Another example application involves a component that has multiple resources (e.g. multiple memory devices, I/O devices, etc.). In a multi-resource component, the access key may be used to delimit one resource set (including one or multiple resources) from another resource set, while ensuring hardware-enforced isolation. For example, if an I/O device is simultaneously shared by multiple non-cooperating components, management software can assign each application a unique access key. The access key may be used to quickly identify resources for a given access.

Another example application involves migration of a virtual machine. A virtual machine refers to an environment implemented in a physical machine that is to emulate an actual machine. A virtual machine can include a guest operating system, an application (or multiple applications) and other components. Multiple virtual machines in a physical machine can share the physical resources of the physical machine.

By using an MRAC according to some implementations, migrating a virtual machine from a source physical machine to a destination physical machine can be simplified. Instead of iteratively copying memory and configuration information of the migrated virtual machine between physical machines, migration can involve the following procedure. The virtual machine to be migrated can be suspended. The data of the virtual machine can be flushed from a processor cache to persistent or volatile memory. The virtual machine's resource access controls are updated, to reflect new access keys, for example. Multiple MRACs within memory modules, I/O modules, and so forth can be updated. The memory region within a memory component can be effectively migrated to the destination physical machine without copying the data between memory components as in a traditional virtual machine migration procedure.

The migrated virtual machine is added to the scheduler of the hypervisor of the destination physical machine. After migration, execution of the migrated virtual machine can be resumed in the destination physical machine.

Figure 11:
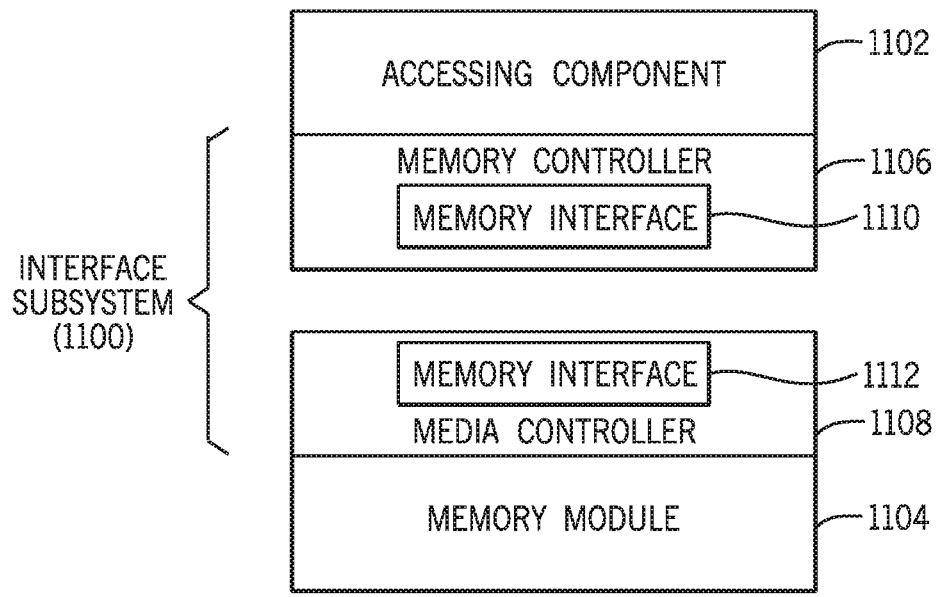
FIG. 11 is a schematic diagram of an example arrangement including an access component and a memory module, according to some implementations.

FIG. 11 is a block diagram of an arrangement that includes an accessing component 1102 and a memory module 1104 (which can be an MRAC component as discussed above, for example). An interface subsystem 1100 is provided between the accessing component 1102 and the memory module 1104. The accessing component 1102 is associated with a memory controller 1106 that interacts with a distinct media controller 1108 associated with the memory module 1104. The memory controller 1106 can be part of the accessing component 1102 or can be separate from the accessing component 1102. Similarly, the media controller 1108 can be part of or separate from the respective memory module 1104. Note that the memory controller 1106 can interact with multiple media controllers, or alternatively, the media controller 1008 can interact with multiple memory controllers.

The memory controller 1106 together with the media controller 1108 form the interface subsystem 1100. By using the interface subsystem 1100, the memory controller 1106 that is associated with the accessing component 1102 does not have to be concerned with issuing commands that are according to specifications of respective memories. For example, a memory can be associated with a specification that governs the specific commands (which can be in the form of signals) and timings of such commands for performing accesses (read access or write access) of data in the memory. The memory controller 1106 can issue a transaction request that is independent of the specification governing access of a specific memory. Note that different types of memories may be associated with different specifications. The transaction request does not include commands that are according to the specification of the memory that is to be accessed.

A transaction request from the memory controller 1106 is received by a respective media controller 1108, which is able to respond to the transaction request by producing command(s) that is (are) according to the specification governing access of a target memory. For example, the command can be a read command, a write command, or another type of command, which has a format and a timing that is according to the specification of the target memory. In addition to producing command(s) responsive to a transaction request from the memory controller 1106, the media controller 1108 is also able to perform other tasks with respect to a memory. For example, if the memory is implemented with a DRAM, then the media controller 1108 is able to perform refresh operations with respect to the DRAM. A storage cell in a DRAM gradually loses its charge over time. To address this gradual loss of charge in a storage cell, a DRAM can be periodically refreshed, to restore the charge of storage cells to their respective levels.

In other examples, if a memory is implemented with a flash memory, then the media controller 1108 can include wear-leveling logic to even out the wear among the storage cells of the memory. In addition, the media controller 1108 can perform other media-specific operations with respect to the memory, such as a data integrity operation (e.g. error detection and correction), a data availability operation (e.g. failover in case of memory error), and so forth. The media controller 1108 can also perform power management (e.g. reduce power setting of the memory when not in use), statistics gathering (to gather performance statistics of the memory during operation), and so forth.

The memory controller 1106 includes a memory interface 1110, which can include a physical layer that governs the communication of physical signals over a link between the memory controller 1106 and a respective media controller 1108. The memory interface 1110 can also include one or multiple other layers that control the communication of information over a link between the memory controller 1106 and a respective media controller 1108.

Each media controller 1108 similarly includes a memory interface 1112, which interacts with the memory interface 1110 of the memory controller 1106. The memory interface 1112 can also include a physical layer, as well as one or multiple other layers.

In some examples, a link between the memory interface 1110 of the memory controller 1106 and the memory interface 1112 of a media controller 1108 can be a serial link. In other examples, the link can be a different type of link. Also, although not shown, a link can include one or multiple switches to route transactions between the memory controller 1106 and the media controller 1108.

The interface subsystem 1100 separates (physically or logically) memory control into two parts: the memory controller 1106 and the media controller(s) 1108. Note that the memory controller 1106 and the media controller(s) 1108 can be physically in separate devices or can be part of the same device. By separating the memory control into two parts, greater flexibility can be achieved in a system that includes different types of memories. The memory controller 1106 does not have to be concerned with the specific types of memories used, since transaction requests issued by the memory controller 1106 would be the same regardless of the type of memory being targeted. By splitting the memory controller 1106 from the media controllers 1108, development of the memory controller 1106 can be simplified.

The interface subsystem 1100 shown in FIG. 11 can also be used to perform communications between other types of components in a system.

Figure 12:
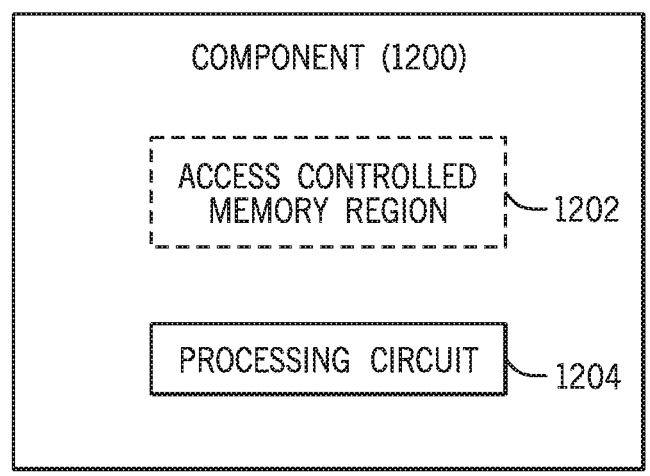
FIG. 12 is a block diagram of a component according to some implementations.

FIG. 12 is a block diagram of a component 1200 according to some implementations. If the component 1200 is an MRAC component, then the component 1200 includes an access controlled memory region 1202. The component 1200 also includes a processing circuit 1204, which can be implemented in hardware or a combination of machine-executable instructions and hardware.

Instructions are stored in respective storage devices, which are implemented as one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
   receiving, by a first component associated with an access controlled memory region, a transaction request including a first protocol header from a second component;
   determining, by the first component based on information in the first protocol header, that the second component is unauthorized to access the access controlled memory region;
   responsively sending, by the first component to the second component, a negative acknowledgment including an identifier of a third component from which the second component is to obtain authorization information usable to access the access controlled memory region;
   receiving, by the first component from the third component, authorization of the second component to access the access controlled memory region;
   receiving, by the first component, a second transaction request including a second protocol header from the second component, the second protocol header including the authorization information;
   determining, by the first component based on the authorization information in the second protocol header, that the second component is authorized to access the access controlled memory region; and
   sending, by the first component to the second component, a transaction response responsive to the second transaction request, the transaction response authorizing access to the access controlled memory region.

2. The method of claim 1, further comprising:
   storing, by the first component, an access control data structure,
   wherein the determining comprises comparing the information in the first protocol header with information in the access control data structure.

3. The method of claim 1, wherein the determining further comprises determine an access level from among a plurality of different access levels based on the information in the first protocol header, wherein different values of the information in the first protocol header correspond to the different access levels.

4. The method of claim 3, wherein the information in the first protocol header includes an access key field, wherein different values of the access key field correspond to the different access levels.

5. The method of claim 4, wherein a first of the different access levels permits a read-write access, and a second of the different access levels permits a read-only access.

6. The method of claim 1, wherein sending the negative acknowledgment comprises sending the negative acknowledgment that includes an identifier of a proxy component that the second component is to access to send the transaction request to for accessing the access controlled memory region.

7. The method of claim 1, further comprising:
   receiving a request associated with performing an atomic update of the access controlled memory region;
   in response to the request, creating a shadow copy of the access controlled memory region; and
   redirecting the transaction request for the access controlled memory region to the shadow copy.

8. A system comprising:
   an access controlled memory region; and
   a first component, a second component associated with the access controlled memory region, and a third component, wherein:
     the first component is to send a transaction request to the second component;
     the second component is to determine that the first component is not authorized to access the access controlled memory region and responsively send the first component a negative acknowledgment containing an identifier of a third component that the first component is to access to obtain access of the access controlled memory region;
     the second component, responsive to the negative acknowledgment, is to send, to the third component, a request to obtain access of the access controlled memory region;
     the third component is to responsively send:
       a response to the first component, the response including an access key useable to access the access controlled memory region;
       the access key to the second component;
     the first component is to send a second transaction request containing the access key to the second component to access the access controlled memory region; and
     the second component is to responsively send to the first component a transaction response authorizing access to the access controlled memory region.

9. The system of claim 8, wherein the third component is a proxy component that forwards the request to obtain access to the second component.

10. The system of claim 8, wherein the access controlled memory region is a first access controlled memory region, and the system further comprises a second access controlled memory region,
- wherein the first component has read-write access of the first access controlled memory region and read-only access of the second access controlled memory region, and
- wherein another component has read-only access of the first access controlled memory region and read-write access of the second access controlled memory region.

11. The system of claim 8, further comprising a plurality of memory domains interconnected by a router and a network, a first of the memory domains including the access controlled memory region, and a second of the memory domains including a shadow copy of the access controlled memory region.

12. A first component comprising:
- an access controlled memory region; and
- a processing circuit to:
  - receive a transaction request including a first protocol header from a second component;
  - determine, based on information in the first protocol header, that the second component is unauthorized to access the access controlled memory region;
  - responsively send, to the second component, a negative acknowledgment including an identifier of a third component from which the second component is to obtain authorization information usable to access the access controlled memory region;
  - receive, from the third component, authorization of the second component to access the access controlled memory region;
  - receive a second transaction request including a second protocol header from the second component, the second protocol header including the authorization information;
  - determine, based on the authorization information in the second protocol header, that the second component is authorized to access the access controlled memory region; and
  - send, to the second component, a transaction response responsive to the second transaction request, the transaction response authorizing access to the access controlled memory region.

* * * * *